US008826166B2

(12) United States Patent
Martino et al.

(10) Patent No.: US 8,826,166 B2
(45) Date of Patent: Sep. 2, 2014

(54) EVALUATING AND COMPARING THE REQUIREMENTS OF A TASK WITH THE CAPABILITIES OF AN ENTITY

(75) Inventors: Jacquelyn A. Martino, Cold Spring, NY (US); Juerg Von Kaenel, Mahopac (CH); Patrick A. Wagstrom, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 13/049,554

(22) Filed: Mar. 16, 2011

(65) Prior Publication Data

US 2012/0131489 A1    May 24, 2012

Related U.S. Application Data

(60) Provisional application No. 61/415,008, filed on Nov. 18, 2010.

(51) Int. Cl.
| | |
|---|---|
| *G06F 3/048* | (2013.01) |
| *G06F 3/0484* | (2013.01) |
| *G06F 3/0482* | (2013.01) |
| *G06F 3/00* | (2006.01) |
| *G06F 3/0481* | (2013.01) |

(52) U.S. Cl.
CPC .............. *G06F 3/0484* (2013.01); *G06F 3/048* (2013.01); *G06F 3/0482* (2013.01); *G06F 3/0481* (2013.01)
USPC ........... 715/772; 715/764; 715/771; 715/788; 715/802; 715/803

(58) Field of Classification Search
CPC ..... G06F 3/048; G06F 3/0481; G06F 3/0482; G06F 3/0484
USPC .................. 715/764, 771, 772, 788, 802, 803
See application file for complete search history.

(56) References Cited

U.S. PATENT DOCUMENTS

| | | | | |
|---|---|---|---|---|
| 6,359,635 | B1 * | 3/2002 | Perttunen ...................... | 715/834 |
| 7,921,379 | B1 * | 4/2011 | Ko ................................. | 715/834 |
| 7,992,102 | B1 * | 8/2011 | De Angelo .................... | 715/834 |
| 2003/0210284 | A1 * | 11/2003 | Vandruff et al. .............. | 345/853 |
| 2007/0005477 | A1 * | 1/2007 | McAtamney ................... | 705/35 |
| 2007/0268300 | A1 * | 11/2007 | (Janet) et al. ................. | 345/581 |
| 2011/0219324 | A1 * | 9/2011 | Watanabe et al. ............. | 715/771 |
| 2012/0042283 | A1 * | 2/2012 | Tuesta et al. .................. | 715/834 |

* cited by examiner

*Primary Examiner* — Nicholas Augustine
(74) *Attorney, Agent, or Firm* — F. Chau & Associates, LLC; Louis J. Percello

(57) ABSTRACT

A method for evaluating the requirements of a task with the capabilities of an entity includes generating a first visual representation, creating a mask based on the first visual representation, applying the mask to a second visual representation, and generating a third visual representation conveying which task requirements the entity is capable of satisfying. The first visual representation includes the requirements of the task, the second visual representation includes the capabilities of the entity, and the third visual representation is generated based on the application of the mask to the second visual representation.

20 Claims, 8 Drawing Sheets

EVALUATING AND COMPARING THE REQUIREMENTS OF A TASK WITH THE CAPABILITIES OF AN ENTITY

CROSS-REFERENCE TO RELATED PATENT APPLICATION

This application claims priority to and the benefit of Provisional Application Ser. No. 61/415,008, filed on Nov. 18, 2010, the contents of which are herein incorporated by reference in their entirety.

BACKGROUND

1. Technical Field

The present disclosure relates to evaluating and comparing the requirements of a task with the capabilities of an entity, and more particularly, to a system and method for evaluating and comparing the requirements of a task with the capabilities of an entity.

2. Discussion of Related Art

The requirements of a task and the capabilities of an entity may be represented in many different ways. For example, in a conventional system, a user may define the requirements of a task or evaluate the capabilities of an entity by answering a set of questions presented in a linear fashion. Such a system results in a lack of context, and a defined task or entity that has little connection between related elements.

For example, consider online digital communities, which enable user-to-user collaboration and self-organization on a large scale. These communities may have different characteristics, and a user may require a digital community having certain characteristics. A system allowing a user to evaluate the characteristics of a digital community and specify the requirements of a task may be used by a user to find a digital community meeting specified task requirements.

Enterprise software firms may be able to benefit from the use of digital communities, however, such firms may have certain security requirements that are not met by the digital communities. Thus, the firms may have to re-implement digital communities for use behind a secure corporate firewall. For example, many firms utilize private instant messaging systems and private social network and communication systems that mirror common online digital communities such as Facebook® and Twitter®. However, failure to properly discern the requirements of a project and the capabilities of a digital community may result in a private digital community that is unable to perform the required tasks.

BRIEF SUMMARY

According to an exemplary embodiment of the present disclosure, a method for evaluating and comparing requirements of a task with capabilities of an entity includes generating a first visual representation, creating a mask based on the first visual representation, applying the mask to a second visual representation, and generating a third visual representation conveying which task requirements the entity is capable of satisfying. The first visual representation includes the task requirements, the second visual representation includes the capabilities of the entity, and the third visual representation is generated based on the application of the mask to the second visual representation.

According to an exemplary embodiment of the present disclosure, a method for evaluating an entity includes generating a first visual representation of the entity, receiving task requirement information, and updating the first visual representation based on the task requirement information. The first visual representation is in the shape of a polygon having at least three sides, and a plurality of cells in the polygon correspond to capabilities of the entity. The updated first visual representation conveys requirements of a task satisfied by the entity, requirements of the task not satisfied by the entity, and capabilities of the entity not used for the task.

BRIEF DESCRIPTION OF THE SEVERAL VIEWS OF THE DRAWINGS

The above and other features of the present disclosure will become more apparent by describing in detail exemplary embodiments thereof with reference to the accompanying drawings, in which.

DETAILED DESCRIPTION

Figure 1:
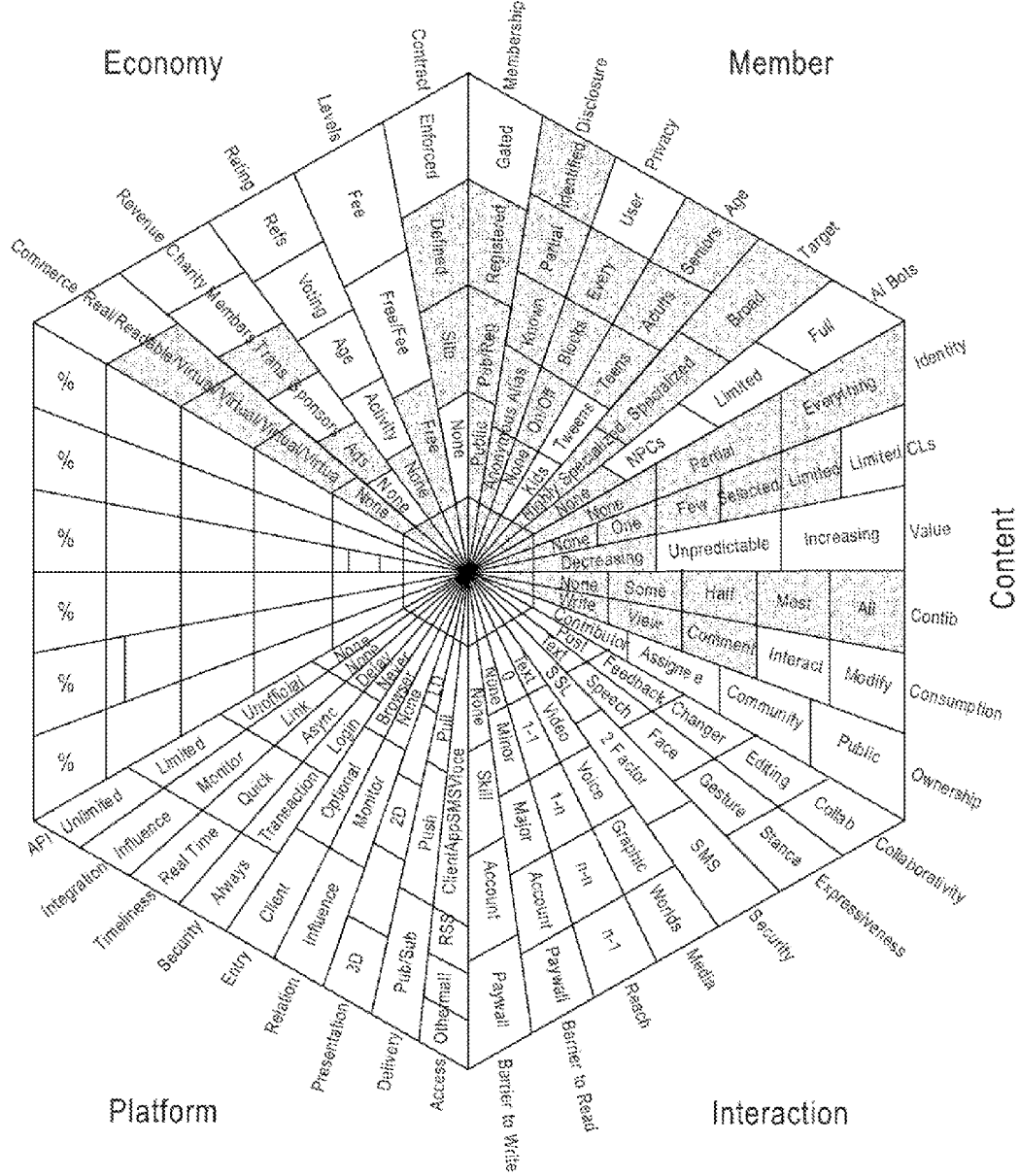
FIG. 1 shows a visual representation of an evaluation candidate representing an online digital community, according to an exemplary embodiment of the present disclosure.

According to exemplary embodiments of the present disclosure, the requirements of a task may be defined and an entity's capability of satisfying the task requirements may be rated, and a real-time visualization may be used to signify the entity's capability of satisfying the task requirements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Exemplary embodiments of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Although certain exemplary embodiments described herein describe task requirements and entities relating to digital communities, the present disclosure is not limited thereto. For example, the present disclosure may be utilized with tasks and entities relating to a variety of areas, such as various software projects, enterprise projects, and business projects.

According to an exemplary embodiment of the present disclosure, an entity's capability of satisfying the requirements of a particular task may be evaluated using evaluation candidates. For example, task requirements may include required characteristics of a digital community, and evaluation candidates may represent candidate digital communities having certain characteristics. Task requirements may be established based on a user's response. For example, questions may be presented to a user, and the requirements of a particular task may be established based on the answers to the questions provided by the user. A visual representation may be used to represent various evaluation candidates corresponding to entities that may be capable of satisfying the task requirements. The evaluation candidates may be organized into multiple axes, and each axis may address characteristics of each evaluation candidate. For example, in an exemplary embodiment, an evaluation candidate representing a digital community may include a purpose axis, an economy axis, a member axis, a platform axis, a content axis, and an interaction axis. The purpose axis corresponds to the reason community members visit the community, and/or the reason the designers of the community built the community. The economy axis corresponds to the types of goods, services, artifacts and reputation related elements that are collected, shared, and traded in the community. The member axis corresponds to the people that the community targets, and how much information about each member the community collects. The platform axis corresponds to the technical features of the platform on which the community is constructed (e.g., the availability of a publicly accessible API). The content axis corresponds to issues regarding the content of the community such as, for example, the origin and ownership of the content in the community, and the ability of community members to interact with and modify the content. The interaction axis corresponds to ways in which community members can express their intentions to each other and directly collaborate with each other, as well as other features related to individual user interaction patterns in the community.

Each axis of an evaluation candidate may be further divided into various voices, each of which addresses a particular characteristic of the corresponding entity. Referring to the exemplary embodiment utilizing evaluation candidates to represent digital communities, as described above, Table 1 illustrates a plurality of voices of the platform axis:

TABLE 1

| Voice | Description |
|---|---|
| API | How can external developers interface with the community? |
| Integration | How does the community integrate with other communities? What can a user do to another online community from inside this community? |
| Timeliness | How long does it take for users' messages to be delivered? |
| Security | Is a secure connection used? |
| Barrier to Entry | How difficult is the primary access to the community? Does it require a browser or something more complicated such as a dedicated client? |
| Relation to Real World | How are users of the community able to interact with the concepts and actions in the real world? |
| Presentation | What is the primary medium for information presentation? |
| Delivery | How does the system deliver content to the users? |
| Access Technologies | How many ways do users have to access the community? |

Each voice may be a different type and may have a different value. For example, a voice may be a multiple-choice type, a scalar type, or a percentage type. A multiple-choice voice may be used in instances where a user response has no logical progression such as, for example, an enumeration of tools that can be used to access a digital community. A scalar voice may be used in instances where a user response includes a logical progression such as, for example, the timeliness of messages in a digital community where a fast response is preferred over a delayed response. A percentage voice may be used to sum the voices of a particular axis (e.g., the purpose axis) to 100%. Table 2 shows possible values for an API voice of a platform axis, according to the exemplary embodiment described above:

TABLE 2

| Value | Description |
|---|---|
| Unlimited | Anyone can use the API with no registration required |
| Limited Access | Public but with various restrictions (e.g., Twitter ®'s flow rate, Google's API keys, charge per query, etc.) |
| Unofficial | An API exists but is not developed by the community owners |
| None | There is no API that an external developer can use to interact with the site |
| No Answer/ Don't Know | Self-explanatory default option |

The utilization of a real-time visual representation to signify an entity's capability of satisfying the requirements of a task allows for the progress of a user to be incrementally displayed as the user is guided through a variety of questions relating to the task requirements.

In an exemplary embodiment, a visual representation of an evaluation candidate is presented to the user. An exemplary embodiment of the visual representation is shown in FIG. 1. As input corresponding to the requirements of a task is received, the visual representation 101 is updated in real-time based on the input.

For example, questions relating to the requirements of a task may be presented to a user. As the user inputs answers to the questions, the visual representation 101 is updated in real-time. The visual representation 101 presents a wide number of related categorical and scalar values at once, presents the complete user response in a single visual representation, avoids unnatural associations between responses, and displays both selected elements (e.g., task requirements) and unselected elements of the visual representation 101. The visual representation 101 may be a polygon having at least three sides, or a circle. Each side of the polygon may represent a different axis of the visual representation 101, each slice of each side may represent a voice, and the individual cells within the slices may represent different voice values. In the exemplary embodiment shown in FIG. 1, the visual representation 101 is a hexagon.

The visual representation 101 may utilize bar plots rather than line plots when referring to scalar voices or percentage voices. As a result, unnatural associations between two neighboring elements are avoided. For example, if a single element in the visual representation 101 has a high score, and neighboring elements have low scores, using line plots would result in a visual spike originating in the area of the visual representation 101 having the single element, and carrying partially into the neighboring areas of the visual representation 101 having the neighboring elements. The utilization of bar plots avoids this unnatural association between neighboring elements. The visual representation 101 is not limited to displaying only scalar elements. For example, the visual representation 101 may represent multiple-choice elements. This allows the visual representation 101 to present a complete user response. The visual representation 101 further allows for the display of both elements selected by the user (e.g., requirements), as well as elements not selected by the user (e.g., capabilities not used for the task).

Once the visual representation 101 has been updated based on the inputted task requirements, the updated visual representation representing the task requirements may be compared to other visual representations representing evaluation candidates corresponding to the capabilities of different entities. For example, when the evaluation candidates correspond to digital communities, the updated visual representation representing the characteristics of a digital community may be compared to visual representations representing other digital communities as created by other users.

Figure 2A:
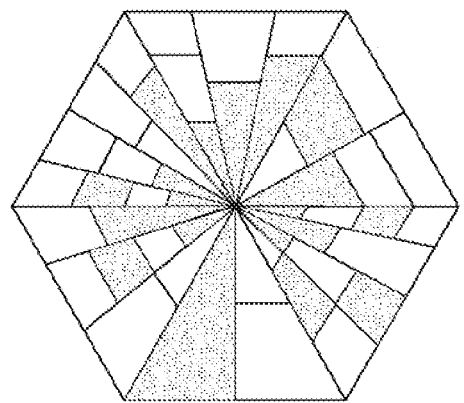
FIGS. 2A-2C show a visual comparison method based on overlaying a first visual representation upon a second visual representation, according to an exemplary embodiment of the present disclosure.
Figure 2B:
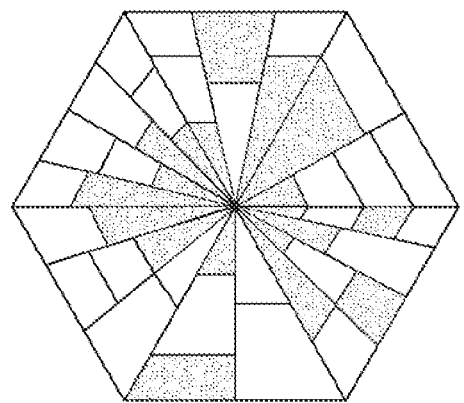
Figure 2C:
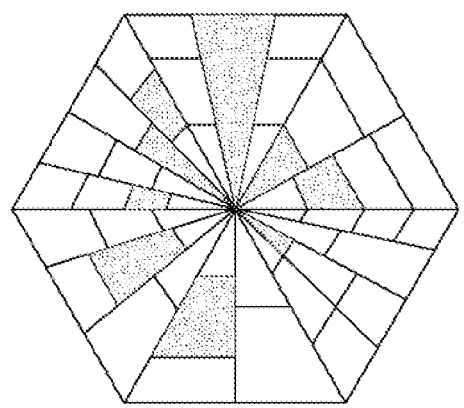

Various visual comparison techniques may be used to compare the updated visual representation to other visual representations. For example, according to an exemplary embodiment, multiple visual representations may be individually presented to a user simultaneously for comparison. In another exemplary embodiment, multiple visual representations may be overlaid upon one another. When overlaid upon each other, the differences between the multiple visual representations are highlighted. For example, consider FIGS. 2A-2C and FIG. 5. FIG. 2A shows a first visual representation 201 that has been generated and corresponds to an updated visual representation representing the requirements of a task (block 501). FIG. 2B shows a second visual representation 202 of an evaluation candidate corresponding to an entity. Overlaying the first visual representation 201 on the second visual representation 202, or the second visual representation 202 on the first visual representation 201, results in the third visual representation 203 shown in FIG. 2C (block 502). In the third visual representation 203, only the cells that are different from one another in the first and second visual representations 201 and 202 are highlighted. Thus, the third visual representation 203 displays which task requirements the evaluation candidate is capable of satisfying.

Figure 3A:
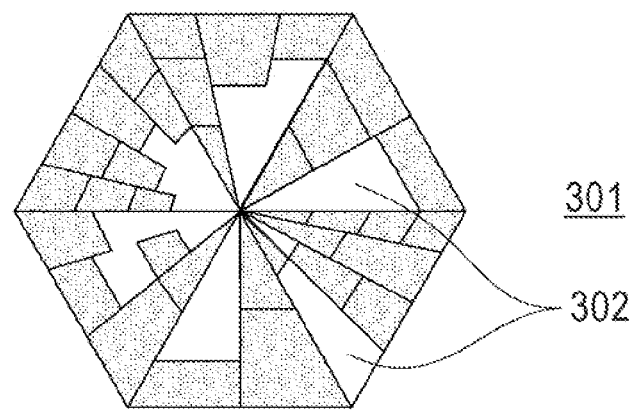
FIGS. 3A-3C show a visual comparison method based on generating a mask and overlaying the mask upon a visual representation, according to an exemplary embodiment of the present disclosure.
Figure 3B:
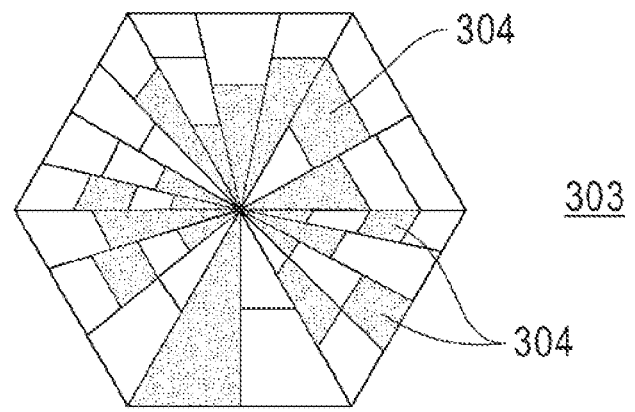
Figure 3C:
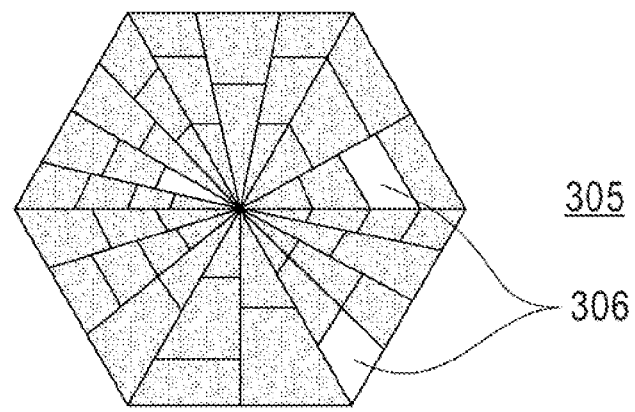

Referring to FIGS. 3A-3C and FIG. 6, a first visual representation is generated based on the requirements of a specific task (block 601). Once generated, the first visual representation is used to create a mask 301, as shown in FIG. 3A (block 602). In the mask 301, the requirements 302 of the task may be transparent. FIG. 3B shows a second visual representation 303 representing an evaluation candidate that shows the requirements 304 satisfied by an entity. The requirements 304 satisfied by the entity are shaded. The mask 301 of FIG. 3A may be applied to the second visual representation 303 of FIG. 3B to generate a third visual representation 305, which illustrates the requirements of the task that are not satisfied by the entity (block 603). The third visual representation 305 is shown in FIG. 3C. The unshaded areas 306 in the third visual representation 305 correspond to requirements of the task that are not satisfied by the entity. Thus, the third visual representation 305 may be used to determine which task requirements are satisfied by the evaluation candidate (block 604). For example, consider a large software firm that creates various software projects. The firm may have a pool of contractors that it has worked with in the past, and may maintain a database of evaluation candidates corresponding to the contractors and the services each contractor offers. When the firm begins working on a new software project, the project requirements may be used to create a visual representation of the new project. The visual representation of the new project can then be compared to visual representations of the evaluation candidates corresponding to the contractors stored in the database. The visual representation corresponding to the new software project may be used to create a mask to identify an evaluation candidate corresponding to a contractor in the database that satisfies the requirements of the new project.

The exemplary embodiment described in FIGS. 3A-3C and FIG. 6 offers a binary classification for the requirements of a task and the capabilities of an entity. However, such a binary classification may not be sufficient when determining to what degree an entity is capable of satisfying the requirements of a task. Referring to the example above, a contractor may have the technological ability to satisfy a certain task requirement, but may have a poor track record of successfully satisfying the requirement. Similarly, when the task requirements are first defined, it may be unclear whether the task actually includes certain requirements. To address these situations, an exemplary embodiment of the present disclosure may utilize a gray scale or alpha channel masking to specify varying importance levels of task requirements, and varying levels of the capability of an entity of satisfying certain task requirements.

Figure 4A:
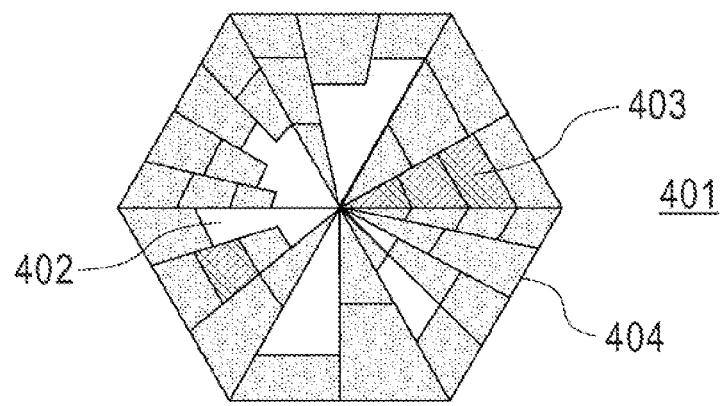
FIGS. 4A-4C show a visual comparison method based on generating a mask and overlaying the mask upon a visual representation, and utilizing various importance levels of varying degrees for different task requirements, according to an exemplary embodiment of the present disclosure.
Figure 4B:
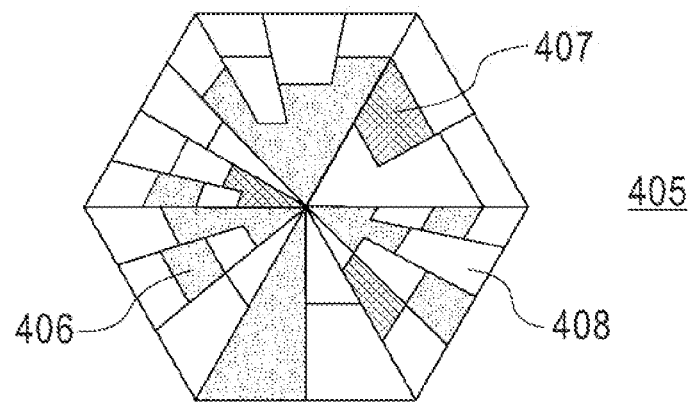
Figure 4C:
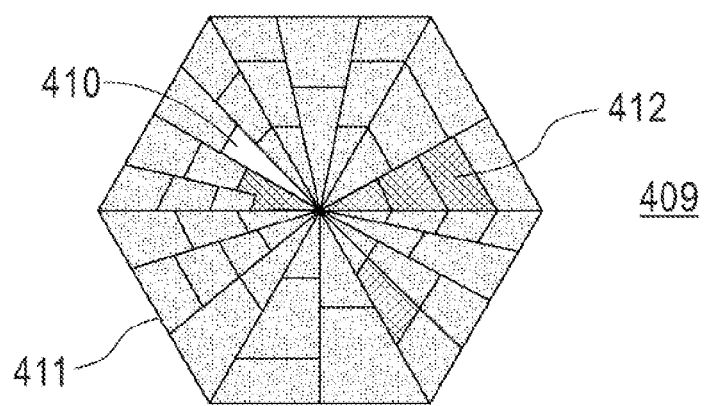
Figure 5:
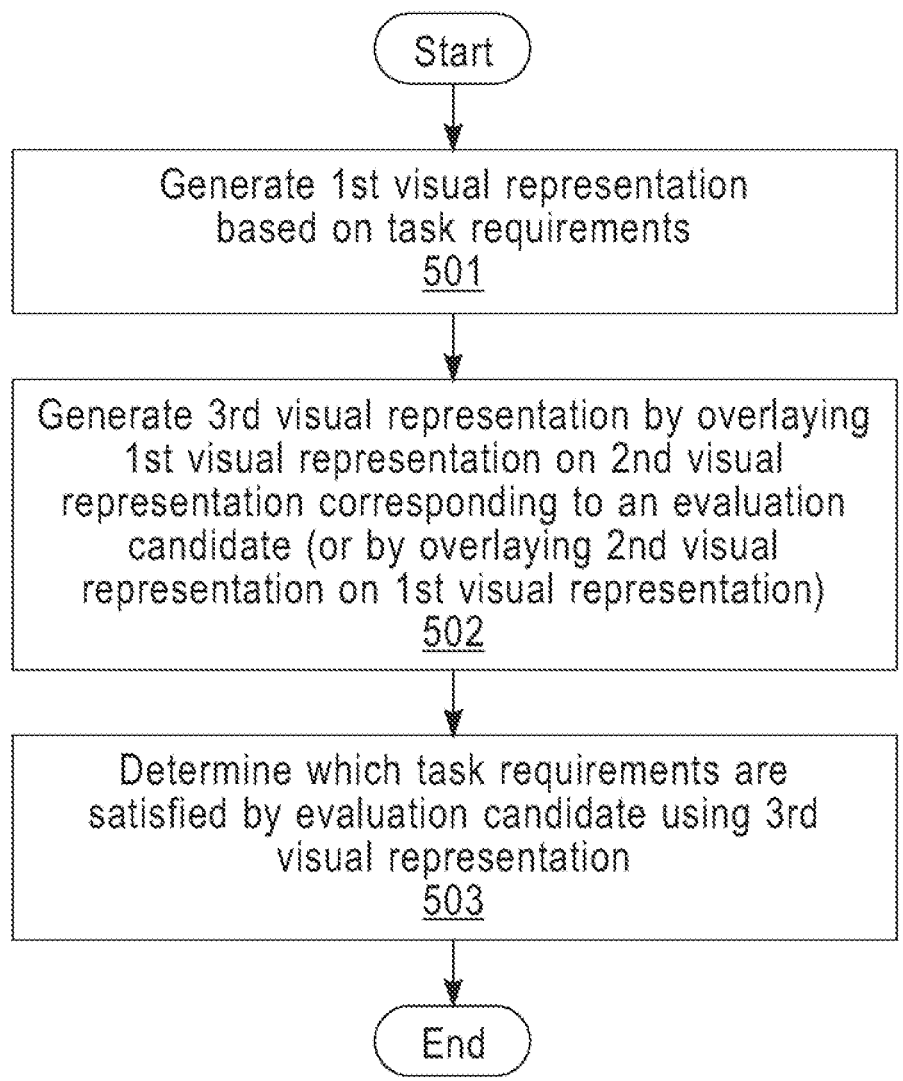
FIG. 5 is a flowchart showing the visual comparison method according to the exemplary embodiment of FIGS. 2A-2C.
Figure 6:
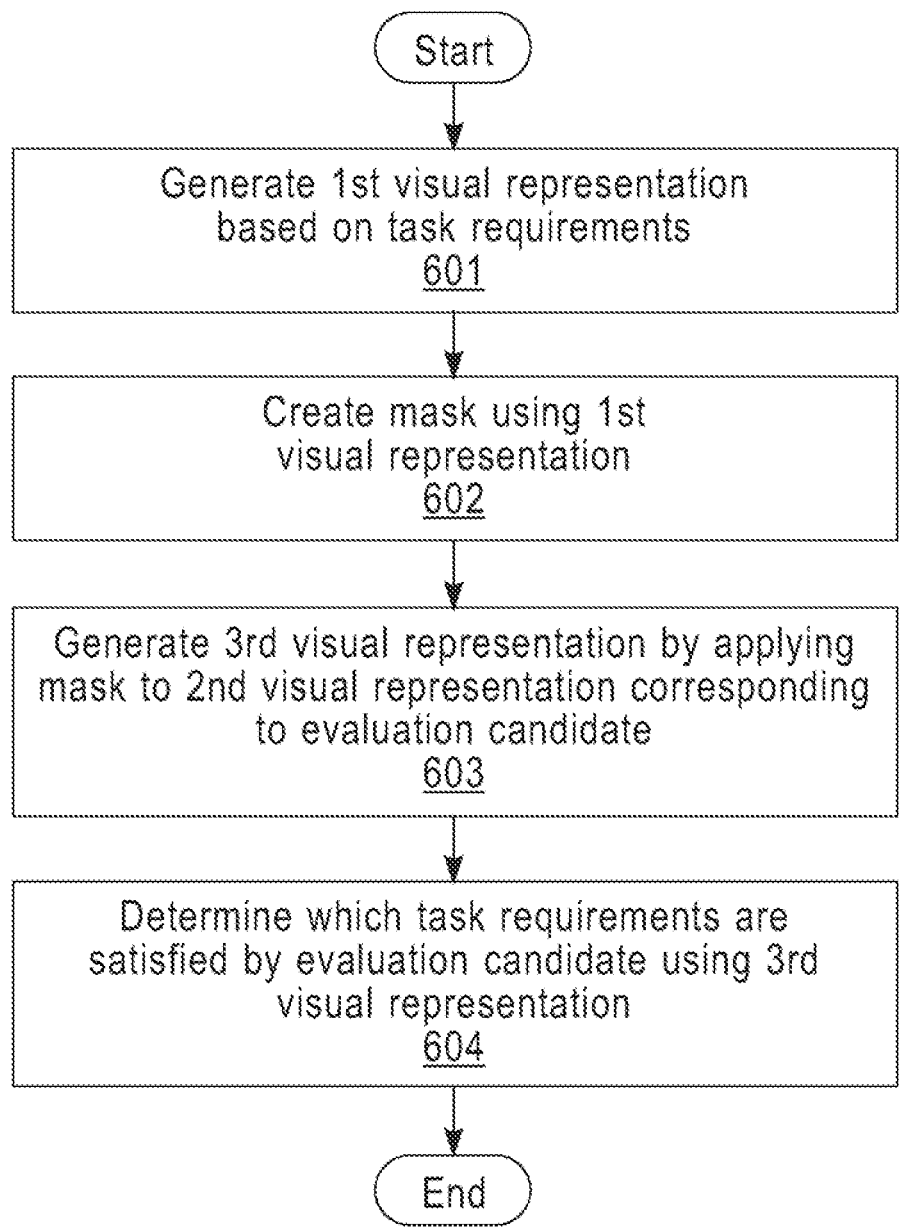
FIG. 6 is a flowchart showing the visual comparison method according to the exemplary embodiment of FIGS. 3A-3C.
Figure 7:
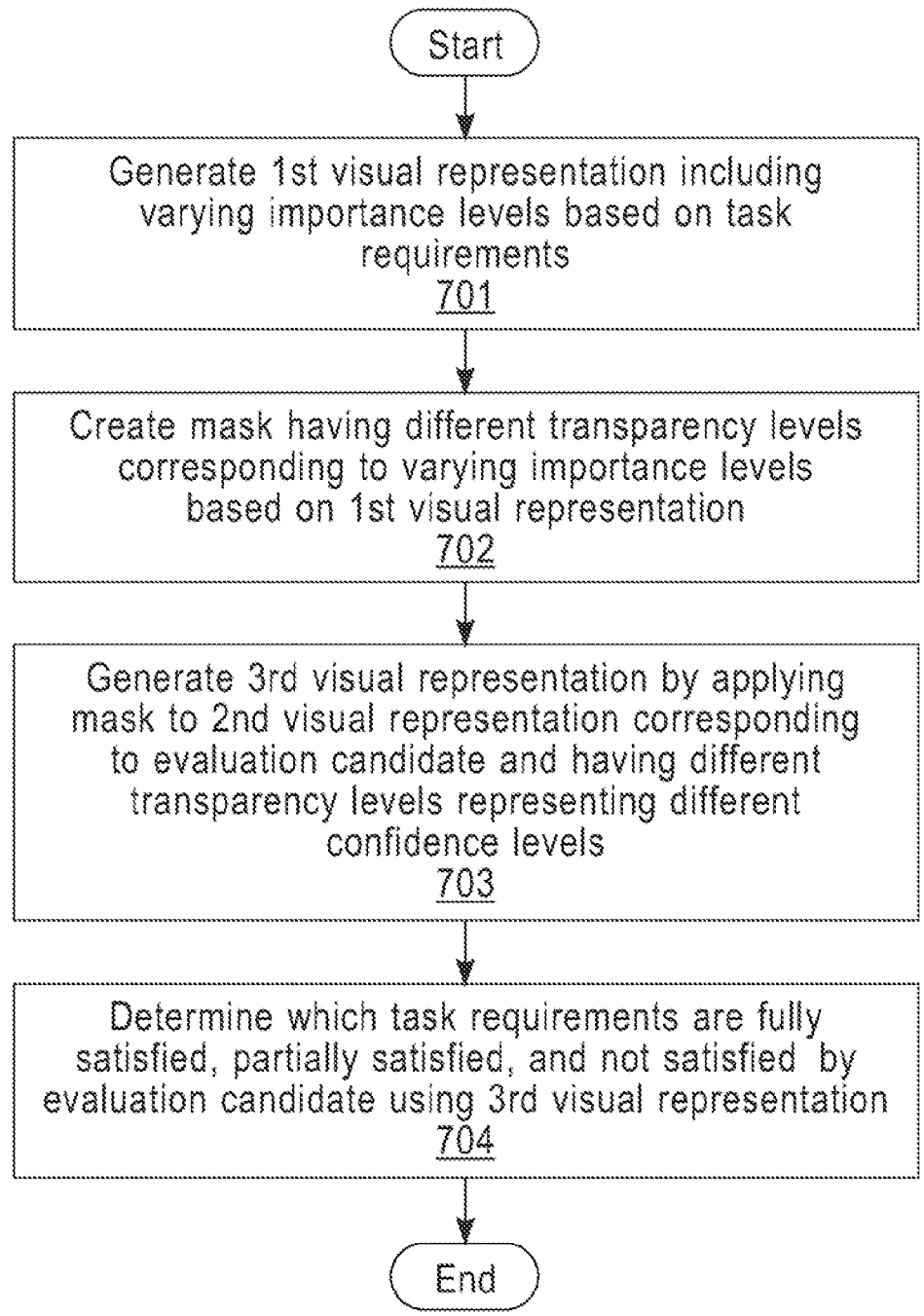
FIG. 7 is a flowchart showing the visual comparison method according to the exemplary embodiment of FIGS. 4A-4C.

For example, a first visual representation generated based on the requirements of a task may include importance levels of varying degrees for different requirements (block 701). Once generated, the first visual representation is used to create a mask 401, as shown in FIG. 4A (block 702). In the mask 401, different transparency levels may be used to differentiate varying importance levels for different task requirements. For example, the more transparent a requirement is, the higher the importance level (e.g., requirement 402 has a higher importance level than requirement 403). The darkest transparency level 404 may represent elements that are not required by the project. FIG. 4B shows a second visual representation 405 representing an evaluation candidate that shows an entity's capability of satisfying certain task requirements. In the second visual representation 405, different levels of transparency may be used to indicate a confidence level corresponding to the entity's capability of satisfying each particular requirement. For example, the less transparent a requirement is, the more capable the entity is of satisfying that requirement (e.g., the entity is more capable of satisfying requirement 406 than requirement 407). The lightest transparency level 408 may represent a requirement that the entity is unable to satisfy. A third visual representation 409 resulting from the application of the mask 401 to the second visual representation 405 is shown in FIG. 4C (block 703). In the third visual representation 409, the fully transparent areas 410 correspond to requirements of the task that are not satisfied by the entity, the fully shaded areas 411 correspond to requirements that are fully satisfied by the entity, and the partially transparent areas 412 correspond to requirements that are partially satisfied by the entity. Thus, the third visual representation 409 may be used to determine which task requirements are fully satisfied, partially satisfied, and not satisfied by the evaluation candidate (block 704)

A task may be defined differently by different users. Similarly, the capabilities of an entity may be defined differently by different users. This may be the result of lack of data, different views of perspectives, or different interpretations of the same question answered by different users.

In an exemplary embodiment, visual representations based on different definitions of the same task or entity may be compared by overlaying the visual representations upon one another, as described above.

In another exemplary embodiment, each of the visual representations may be treated as one component of a whole, and gradient scaling may be used. For example, if five users are evaluating the capabilities of an evaluation candidate representing a digital community, and three of the users believe that the digital community includes an API allowing external developers to interface with the digital community, while two users do not believe such an API is present, the API element may receive a 0.6 rating, and an appropriate gradient level may be given to the element in the visual representation corresponding to the digital community's capability of providing the API.

The above exemplary embodiments may be implemented using a web service that maintains access to a database of evaluation candidates. Therefore, a system that provides real-time responses may be implemented. For example, as a user inputs the requirements of a task, evaluation candidates and their respective capabilities may initially appear, and later disappear if they are no longer viable based on the task requirements. Thus, a user can easily discern the task requirements that will be the most difficult to implement.

The flowcharts and block diagrams in the figures illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
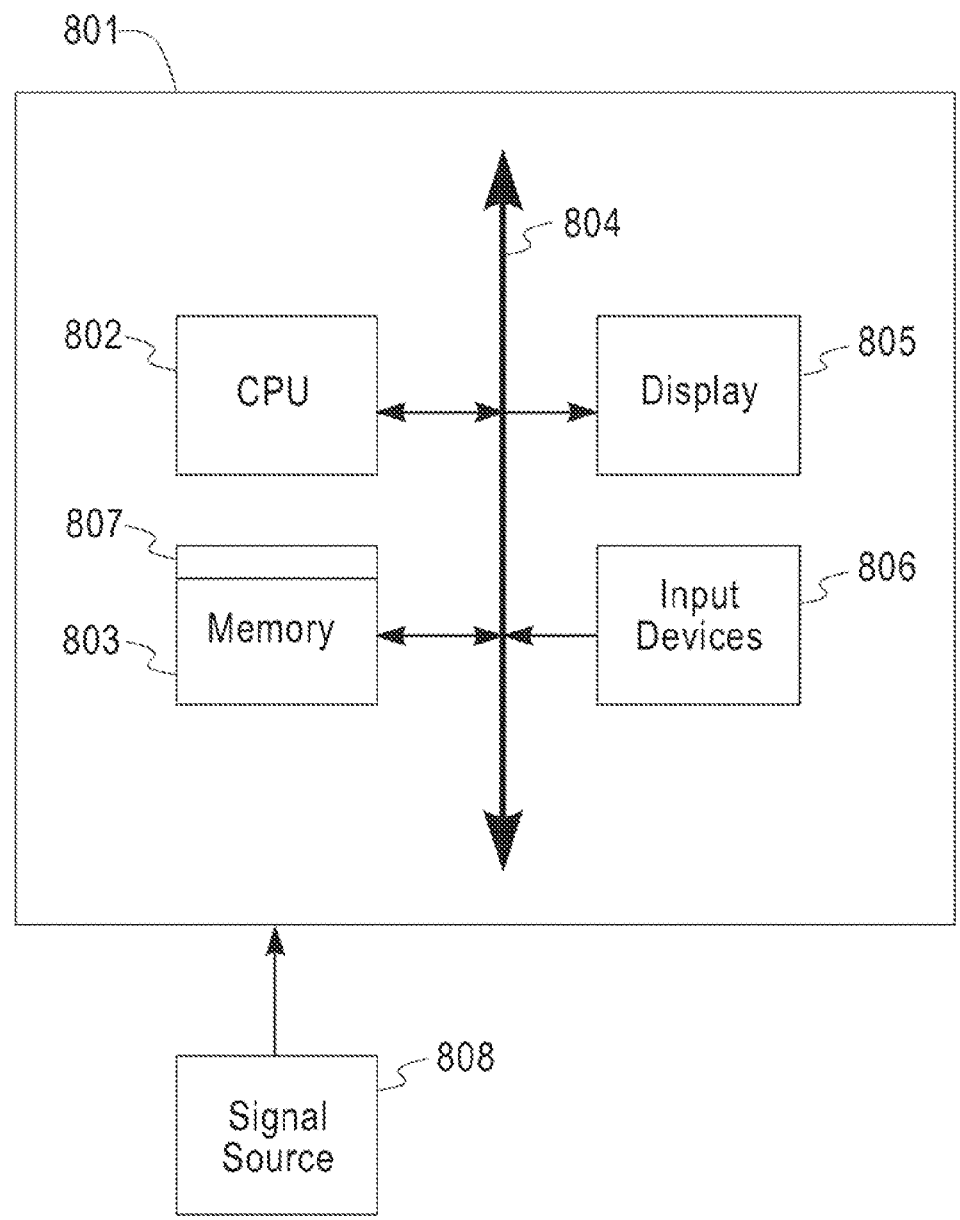
FIG. 8 is a computer system for implementing a method of evaluating and comparing the requirements of a task with the capabilities of an entity, according to an exemplary embodiment of the present disclosure.

More particularly, referring to FIG. 8, according to an exemplary embodiment of the present disclosure, a computer system 801 for evaluating and comparing the requirements of a task with the capabilities of an entity can comprise, inter alia, a central processing unit (CPU) 802, a memory 803 and an input/output (I/O) interface 804. The computer system 801 is generally coupled through the I/O interface 804 to a display 805 and various input devices 806 such as a mouse and keyboard. The support circuits can include circuits such as cache, power supplies, clock circuits, and a communications bus. The memory 803 can include random access memory (RAM), read only memory (ROM), disk drive, tape drive, etc., or a combination thereof. Embodiments of present disclosure may be implemented as a routine 807 stored in memory 803 (e.g., a non-transitory computer-readable storage medium) and executed by the CPU 802 to process the signal from the signal source 808. As such, the computer system 801 is a general-purpose computer system that becomes a specific purpose computer system when executing the routine 807 of the present disclosure.

The computer platform 801 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

Having described embodiments for evaluating and comparing the requirements of a task with the capabilities of an entity, it is noted that modifications and variations can be made by persons skilled in the art in light of the above teachings. It is therefore to be understood that changes may be made in exemplary embodiments of the disclosure, which are within the scope and spirit of the disclosure as defined by the appended claims. Having thus described exemplary embodiments of the disclosure with the details and particularity required by the patent laws, what is claimed and desired protected by Letters Patent is set forth in the appended claims.

What is claimed is:

1. A non-transitory computer readable storage medium embodying instructions executed by a processor to perform a method for evaluating and comparing requirements of a requested task to be completed with capabilities of an entity, comprising:
    generating a first visual representation, wherein the first visual representation indicates the requirements of the requested task, and the requirements of the requested task indicate characteristics that the entity must have to be considered capable of performing the requested task;
    creating a mask based on the first visual representation;
    applying the mask to a second visual representation, wherein the second visual representation indicates the capabilities of the entity and does not indicate the requirements of the requested task, and the capabilities of the entity represent task requirements that the entity is capable of satisfying;
    generating a third visual representation that indicates which requirements of the requested task the entity is capable of satisfying, based on the application of the mask to the second visual representation;
    assigning varying importance levels to the requirements of the requested tasks, wherein the varying importance levels of the requirements of the requested task are represented by two or more cells in the mask having varying levels of transparency;
    assigning varying confidence levels to the capabilities of the entity, wherein the varying confidence levels of the capabilities of the entity are represented by two or more cells in the second visual representation having varying levels of transparency; and
    indicating varying levels of capability of the entity of satisfying the requirements of the requested task using two or more cells in the third visual representation having varying levels of transparency.

2. The computer readable storage medium of claim 1, further comprising:
    associating the requirements of the requested task in the mask with transparent cells.

3. The computer readable storage medium of claim 2, further comprising:
    associating the capabilities of the entity in the second visual representation with shaded cells.

4. The computer readable storage medium of claim 3, further comprising:
    associating the requirements of the requested task that the entity is not capable of satisfying in the third visual representation with transparent cells.

5. The computer readable storage medium of claim 1, further comprising:
    generating the first visual representation based on a plurality of visual representations including the requirements of the requested task.

6. The computer readable storage medium of claim 5, wherein each of the plurality of visual representations is created using different definitions of the requested task based on different input.

7. The computer readable storage medium of claim 6, further comprising:
    assigning an aggregate rating to each of the requirements of the requested task in the first visual representation based on ratings assigned to each requirement in the plurality of visual representations,
    wherein a task requirement having a high aggregate rating is more transparent than a task requirement having a low aggregate rating.

8. The computer readable storage medium of claim 1, wherein the second visual representation is based on a plurality of visual representations including the capabilities of the entity.

9. The computer readable storage medium of claim 8, wherein each of the plurality of visual representations is created using different definitions of the capabilities of the entity based on input from different users.

10. The computer readable storage medium of claim 9, further comprising:
    assigning an aggregate rating to each of the capabilities in the second visual representation based on ratings assigned to each capability in the plurality of visual representations by each of the different users,
    wherein a capability having a high aggregate rating is less transparent than a capability having a low aggregate rating.

11. The computer readable storage medium of claim 1, further comprising:
    applying the mask to a plurality of visual representations in a database,
    wherein the plurality of visual representations correspond to a plurality of evaluation candidates representing different entities.

12. The computer readable storage medium of claim 1, further comprising:
    receiving input including the requirements of the requested task.

13. The computer readable storage medium of claim 12, further comprising:
    creating the mask in real-time as the input is received.

14. The computer readable storage medium of claim 1, wherein the first, second and third visual representations include multiple-choice elements and scalar elements.

15. The computer readable storage medium of claim 1, wherein the first, second and third visual representations are in a shape of a polygon having at least 3 sides.

16. The computer readable storage medium of claim 1, wherein the entity is an online digital community comprising a plurality of digital community members.

17. The computer readable storage medium of claim 16, wherein the capabilities of the entity correspond to services offered by the online digital community to the plurality of digital community members.

18. A non-transitory computer readable storage medium embodying instructions executed by a processor to perform a method for evaluating and comparing requirements of a requested task to be completed with capabilities of an entity, comprising:

generating a first visual representation, wherein the first visual representation indicates the requirements of the requested task, and the requirements of the requested task indicate characteristics that the entity must have to be considered capable of performing the requested task;

creating a mask based on the first visual representation;

applying the mask to a second visual representation, wherein the second visual representation indicates the capabilities of the entity and does not indicate the requirements of the requested task, and the capabilities of the entity represent task requirements that the entity is capable of satisfying; and generating a third visual representation that indicates which requirements of the requested task the entity is capable of satisfying, based on the application of the mask to the second visual representation, wherein the entity is an online digital community comprising a plurality of digital community members, wherein the capabilities of the entity correspond to services offered by the online digital community to the plurality of digital community members, wherein the second visual representation comprises a plurality of axes, and the plurality of axes comprise a purpose axis indicating at least one reason community members visit the online digital community, a member axis indicating a type of member targeted by the community and an amount of information the online digital community collects for each member of the online digital community, and a platform axis indicating at least one technical feature of the platform on which the online digital community is constructed.

19. The computer storage medium of claim 17, further comprising:

presenting a plurality of queries to a user, wherein the third visual representation is displayed to the user and is updated in real-time based on responses to the plurality of queries input by the user, wherein the responses indicate the requirements of the requested task.

20. The computer readable storage medium of claim 1, wherein the entity is an online digital community, the capabilities of the entity correspond to services offered by the online digital community, the second visual representation comprises a plurality of axes, and each axis of the plurality of axes represents a different characteristic of the entity.

* * * * *